G. M. HOPKINS.
Pipe or Hose-Coupling.

No. 162,169

Patented April 20, 1875.

Witnesses:
H. M. Hopkins
John A. Straight

Inventor:
Geo M. Hopkins.

UNITED STATES PATENT OFFICE.

GEORGE M. HOPKINS, OF ALBION, NEW YORK.

IMPROVEMENT IN PIPE OR HOSE COUPLINGS.

Specification forming part of Letters Patent No. 162,169, dated April 20, 1875; application filed February 21, 1874.

*To all whom it may concern:*

Be it known that I, GEO. M. HOPKINS, of Albion, in the county of Orleans and State of New York, have invented certain Improvements in Couplings for Pipe or Hose, of which the following is a specification:

The object of my invention is to furnish a coupling for pipes or hose used in braking or heating railway-cars by steam, which may be quickly coupled, and which shall uncouple automatically when the cars are separated, and at the same time shut off the steam.

My invention consists, first, and mainly, in the use of a cam or section of a screw-thread fixed on one part of the coupling, and a spring-catch of any suitable design attached to the adjacent part, so that it may engage with the cam or section of a screw-thread by putting the parts of the coupling together, and turning them until the catch, following up the cam, causes the parts of the coupling to come together with considerable force. The coupling is released by tripping the catch by means of a chain or cord. Second, my invention consists in the combination of the check-valve in each of the adjacent parts of the coupling with the devices described above. These valves are so arranged as to become unseated when the coupling is united, making a continuous passage through the pipes. The coupling may have a check-valve in one of the parts, and a cross-bar in the other, which may force the valve from its seat when the coupling is united.

Figure 1:
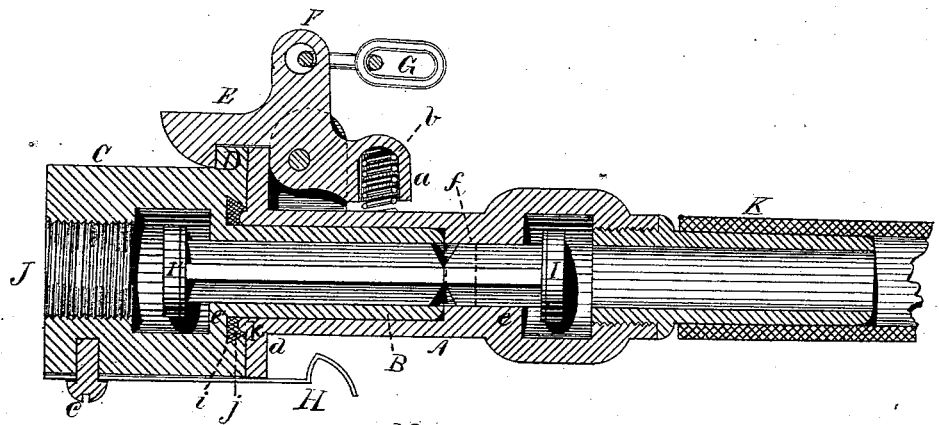
Figure 2:
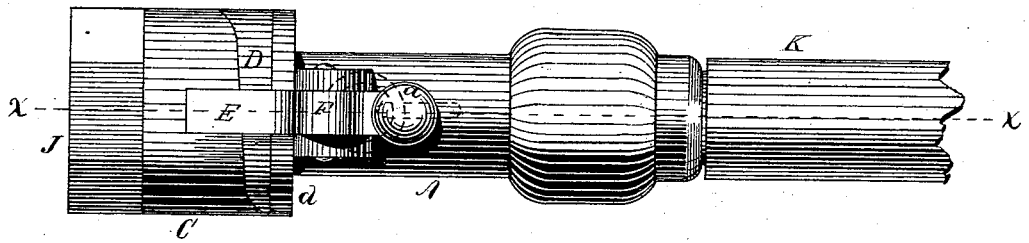

In the accompanying drawing, Figure 1 is a longitudinal section on line $x\ x$, Fig. 2; and Fig. 2 is a top view of Fig. 1.

The part A is fitted to slip over the sleeve B. D is a cam or section of a screw-thread cast on the part C. E is a spring-catch, which is attached to the part A in such a manner as to be capable of engaging with the cam D. This catch is provided with an arm, F, which extends upward, and is connected with a chain, G. A recess is also made at $a$ for the spring $b$. The chain G is connected with some solid object, and is a little shorter than the flexible pipe attached to the coupling, so as to admit of the coupling being released before the flexible pipe is strained, in case the cars are separated by accident or otherwise. H is a spring-catch, fixed to the part C at $c$, and is long enough to admit of the coupling being separated a small distance, where it retains the flange $d$. This spring-catch is intended to retain the part A after the catch E has been tripped, and the valves have found their seat; but, as this catch is beveled, a little force in addition to that required to trip the catch E will free the part A from the catch H when it is desired to separate the coupling entirely. I I' are valves, which are placed in the parts A and C, having their seats at $e\ e'$. The stems of these valves are so long that when the parts of the coupling are united the stems abut, and force the valves from their seats, making a free passage through the coupling.

In some cases the valve I may be dispensed with, and the valve I' used alone; and the cross-bar $f$ (shown in the dotted lines) may be used to force it from its seat.

The iron pipe is screwed into the coupling at J, and the flexible pipe is attached at K. A groove, $i$, is cut in the part C to receive a packing-ring, $j$. A corresponding ridge, $k$, is made on the part A.

I am aware that the valves I I', arranged in the adjacent parts of the coupling to operate as above described, are not new; therefore I shall not broadly claim them.

I claim as my invention—

1. The combination of the part A, catch E, part C, cam D, and chain G, substantially as specified.

2. The combination of the parts A and C and spring H, when arranged to operate in the manner specified.

3. The combination of the parts A and C, catch E, chain G, cam D, spring-catch H, and valves I I', substantially as shown and described.

GEO. M. HOPKINS.

Witnesses:
JOHN A. STRAIGHT,
R. ANDREWS, Jr.